(12) United States Patent
Gerken et al.

(10) Patent No.: US 11,098,518 B2
(45) Date of Patent: Aug. 24, 2021

(54) POWER TAILGATE MOTOR MOUNT CARTRIDGE ASSEMBLY

(71) Applicants: Randy T Gerken, White Lake, MI (US); Gary Bastian, Livonia, MI (US); Frederick F Bender, South Lyon, MI (US); Paul S Van Norman, Fenton, MI (US)

(72) Inventors: Randy T Gerken, White Lake, MI (US); Gary Bastian, Livonia, MI (US); Frederick F Bender, South Lyon, MI (US); Paul S Van Norman, Fenton, MI (US)

(73) Assignee: FCA US LLC, Auburn Hills, MI (US)

( * ) Notice: Subject to any disclaimer, the term of this patent is extended or adjusted under 35 U.S.C. 154(b) by 134 days.

(21) Appl. No.: 16/218,660

(22) Filed: Dec. 13, 2018

(65) Prior Publication Data
US 2020/0190887 A1 Jun. 18, 2020

(51) Int. Cl.
*E05F 15/611* (2015.01)
*B60P 1/26* (2006.01)
*B62D 33/027* (2006.01)

(52) U.S. Cl.
CPC .............. *E05F 15/611* (2015.01); *B60P 1/26* (2013.01); *B62D 33/0273* (2013.01); *E05Y 2600/41* (2013.01); *E05Y 2600/46* (2013.01); *E05Y 2900/546* (2013.01)

(58) Field of Classification Search
CPC ...... E05F 15/611; B60P 1/26; B62D 33/0273; E05Y 2600/41; E05Y 2900/546; E05Y 2600/46
USPC ....................... 296/57.1, 50, 146.8, 51, 146.4
See application file for complete search history.

(56) References Cited

U.S. PATENT DOCUMENTS

| 4,702,511 | A | 10/1987 | Olins | |
|---|---|---|---|---|
| 2007/0152471 | A1* | 7/2007 | Zagoroff | B62D 33/03 296/146.4 |
| 2015/0217631 | A1 | 8/2015 | Warburton et al. | |
| 2015/0361710 | A1* | 12/2015 | Hansen | E05F 15/614 296/51 |
| 2017/0089116 | A1 | 3/2017 | Heiberger et al. | |
| 2018/0251164 | A1* | 9/2018 | Jergess | B62D 33/037 |
| 2018/0266161 | A1* | 9/2018 | Jergess | E05F 15/603 |

* cited by examiner

*Primary Examiner* — D Glenn Dayoan
*Assistant Examiner* — E Turner Hicks
(74) *Attorney, Agent, or Firm* — Ralph E. Smith

(57) ABSTRACT

A power tailgate assembly for a vehicle includes a tailgate configured to rotatably couple to the vehicle, the tailgate having an inner panel, an outer panel, a bottom panel, and first and second side panels defining an inner cavity. An opening is defined in at least one of the first side panel and the bottom panel, and a motor mount cartridge assembly is disposed in the inner cavity at least partially within the opening to at least partially conceal the motor mount cartridge assembly within the tailgate. When installed, the motor mount cartridge assembly covers the opening without need for a discrete cover for the opening.

6 Claims, 5 Drawing Sheets

POWER TAILGATE MOTOR MOUNT CARTRIDGE ASSEMBLY

FIELD

The present application relates generally to vehicle tailgates and, more particularly, to a motor mount cartridge assembly for a power tailgate.

BACKGROUND

Some vehicles such as pickup trucks include cargo areas accessible by a tailgate. Some tailgates can be automatically opened and closed via one or more motors. Conventional powered tailgates have to this point required a motor installation opening that requires a close-off cover, which can result in unbalanced loads and undesirable appearances, as well as additional cost and complexity associated with manufacturing the vehicle. While such conventional power tailgates work well for their intended purpose, there remains a need for improvement in the relevant art.

SUMMARY

In one example aspect of the invention, a power tailgate assembly for a vehicle is provided. In one example embodiment, the assembly includes a tailgate configured to rotatably couple to the vehicle, the tailgate having an inner panel, an outer panel, a bottom panel, and first and second side panels defining an inner cavity, an opening defined in at least one of the first side panel and the bottom panel, and a motor mount cartridge assembly disposed in the inner cavity at least partially within the opening to at least partially conceal the motor mount cartridge assembly within the tailgate. When installed, the motor mount cartridge assembly covers the opening without need for a discrete cover for the opening.

In addition to the foregoing, the described power tailgate assembly may include one or more of the following features: wherein the motor mount cartridge assembly is coupled to the inner panel and the first side panel, the motor mount cartridge assembly including a bottom wall such that the motor mount cartridge assembly automatically covers the opening with the bottom wall when installed to the tailgate; wherein the motor mount cartridge assembly includes a pivot cup configured to receive a post extending from the vehicle to rotatably couple the tailgate to the vehicle.

In addition to the foregoing, the described power tailgate assembly may include one or more of the following features: wherein the motor mount cartridge assembly comprises a motor assembly coupled to a cartridge body; wherein the cartridge body includes a bottom wall, a side wall, and a front wall; wherein the motor assembly is coupled to the front wall and the bottom wall; and wherein the cartridge body includes a plurality of locating and retaining tabs extending from the front wall.

In addition to the foregoing, the described power tailgate assembly may include one or more of the following features: wherein the cartridge body includes an integrally formed pivot cup configured to receive a post extending from the vehicle to rotatably couple the tailgate to the vehicle; wherein the motor assembly comprises a motor, a driveshaft, and an electrical connector; and wherein the motor mount cartridge assembly is installed in the inner cavity between the tailgate inner and outer panels such that an uninterrupted surface is maintained of the inner and outer panels.

In another aspect of the invention, a vehicle is provided. In one example embodiment, the vehicle includes a power tailgate assembly comprising a tailgate rotatably coupled to the vehicle, the tailgate having an inner panel, an outer panel, a bottom panel, and first and second side panels defining an inner cavity, an opening defined in at least one of the first side panel and the bottom panel, and a motor mount cartridge assembly disposed in the inner cavity at least partially within the opening to at least partially conceal the motor mount cartridge assembly within the tailgate. When installed, the motor mount cartridge assembly covers the opening without need for a discrete cover for the opening.

In addition to the foregoing, the described vehicle may include one or more of the following features: wherein the vehicle is a pickup truck with a truck bed defined at least partially by the tailgate; wherein the motor mount cartridge assembly is coupled to the inner panel and the first side panel, the motor mount cartridge assembly including a bottom wall such that the motor mount cartridge assembly automatically covers the opening with the bottom wall when installed to the tailgate; and wherein the motor mount cartridge assembly includes a pivot cup configured to receive a post extending from the vehicle to rotatably couple the tailgate to the vehicle.

In addition to the foregoing, the described vehicle may include one or more of the following features: wherein the motor mount cartridge assembly comprises a motor assembly coupled to a cartridge body; wherein the cartridge body includes a bottom wall, a side wall, and a front wall; wherein the motor assembly is coupled to the front wall and the bottom wall; wherein the cartridge body includes an integrally formed pivot cup configured to receive a post extending from the vehicle to rotatably couple the tailgate to the vehicle; and wherein the motor assembly comprises a motor, a driveshaft, and an electrical connector.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

According to the principles of the present disclosure, a concealed drive unit for a powered pickup tailgate is presented. The drive unit powers the tailgate up and down without assistance by the user. A bottom of the tailgate includes an opening between inner and outer panels that is configured to receive a cartridge assembly, which includes the drive unit (e.g., motor assembly) mounted onto a structural cartridge. The cartridge assembly quickly and easily installs vertically into the opening and is substantially concealed within the tailgate cavity between the inner and outer panels. The cartridge includes an integrated pivot cup to enable pivotal coupling with a post on the vehicle. A bottom surface of the cartridge assembly automatically closes out the opening when installed in the tailgate.

Figure 1:
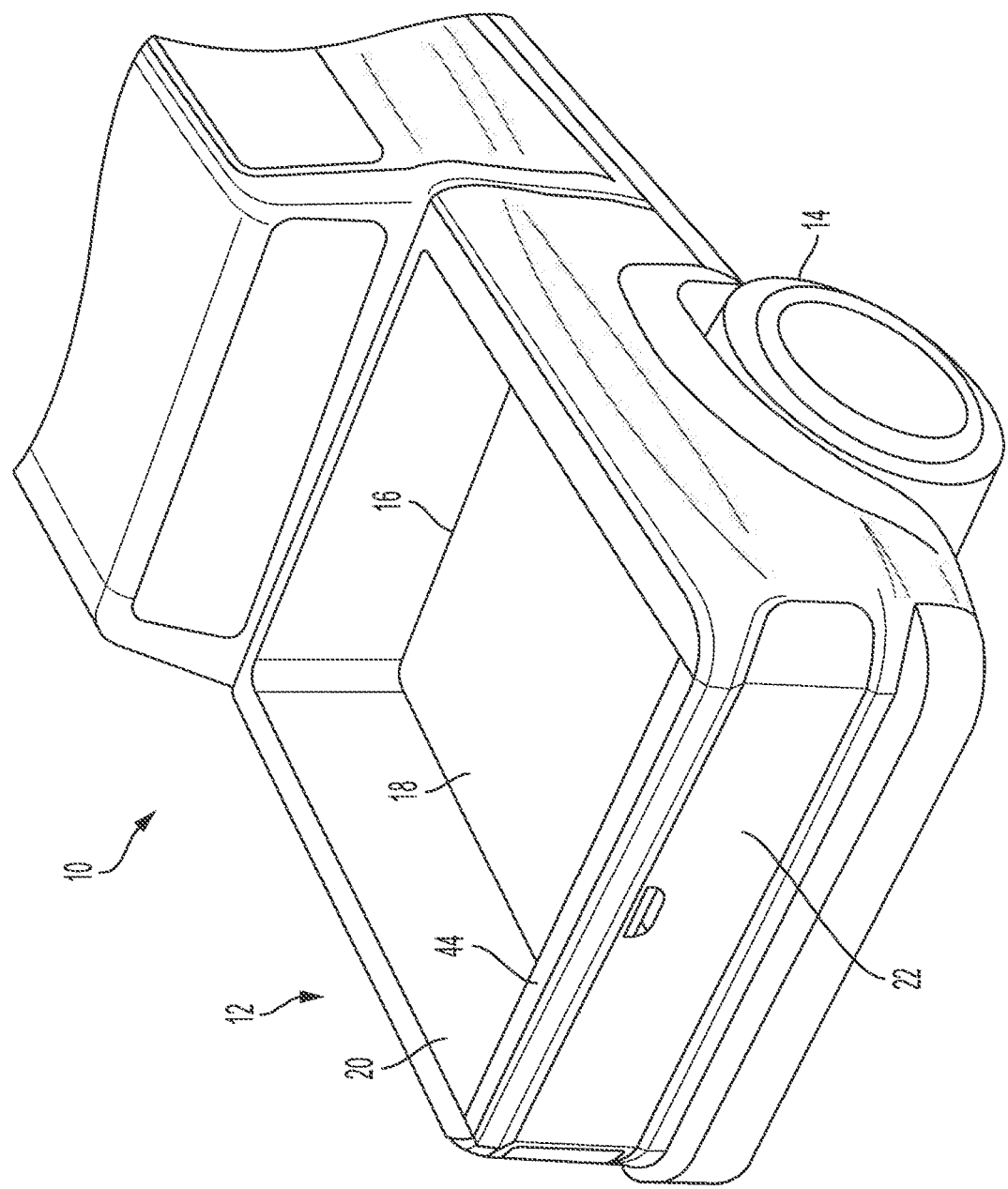
FIG. 1 is a rear perspective view of a vehicle having a storage bed with a tailgate in a closed position according to the principles of the present disclosure.

Referring now to FIG. 1, a rear perspective view of a vehicle 10 is illustrated. The vehicle 10 has a storage bed 12 located above one or more rear wheels 14. In one exemplary implementation, the vehicle 10 is a pickup truck as illustrated. In another exemplary implementation, the vehicle 10 is a vehicle having a cargo area above the rear wheel(s) 14 and a closure member, such as a sport utility vehicle with a rear cargo area and a rear hatch. The storage bed 12 has a cargo area 16 having a floor 18, sidewalls 20, and a tailgate 22 that is shown in a closed position.

Figure 2:
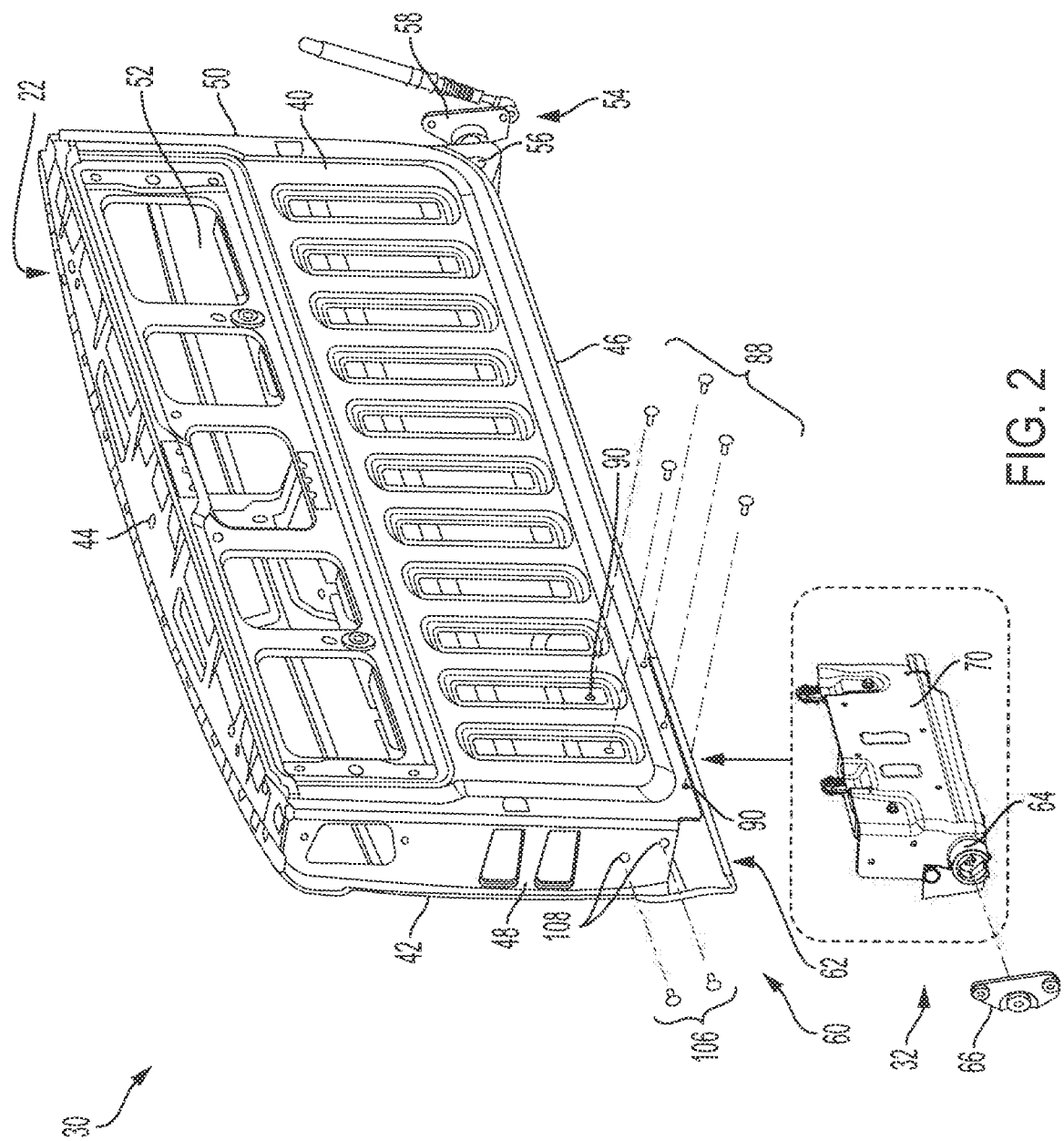
FIG. 2 is a perspective view of an example tailgate and power tailgate motor mount cartridge assembly, before assembling, according to the principles of the present disclosure.
Figure 3:
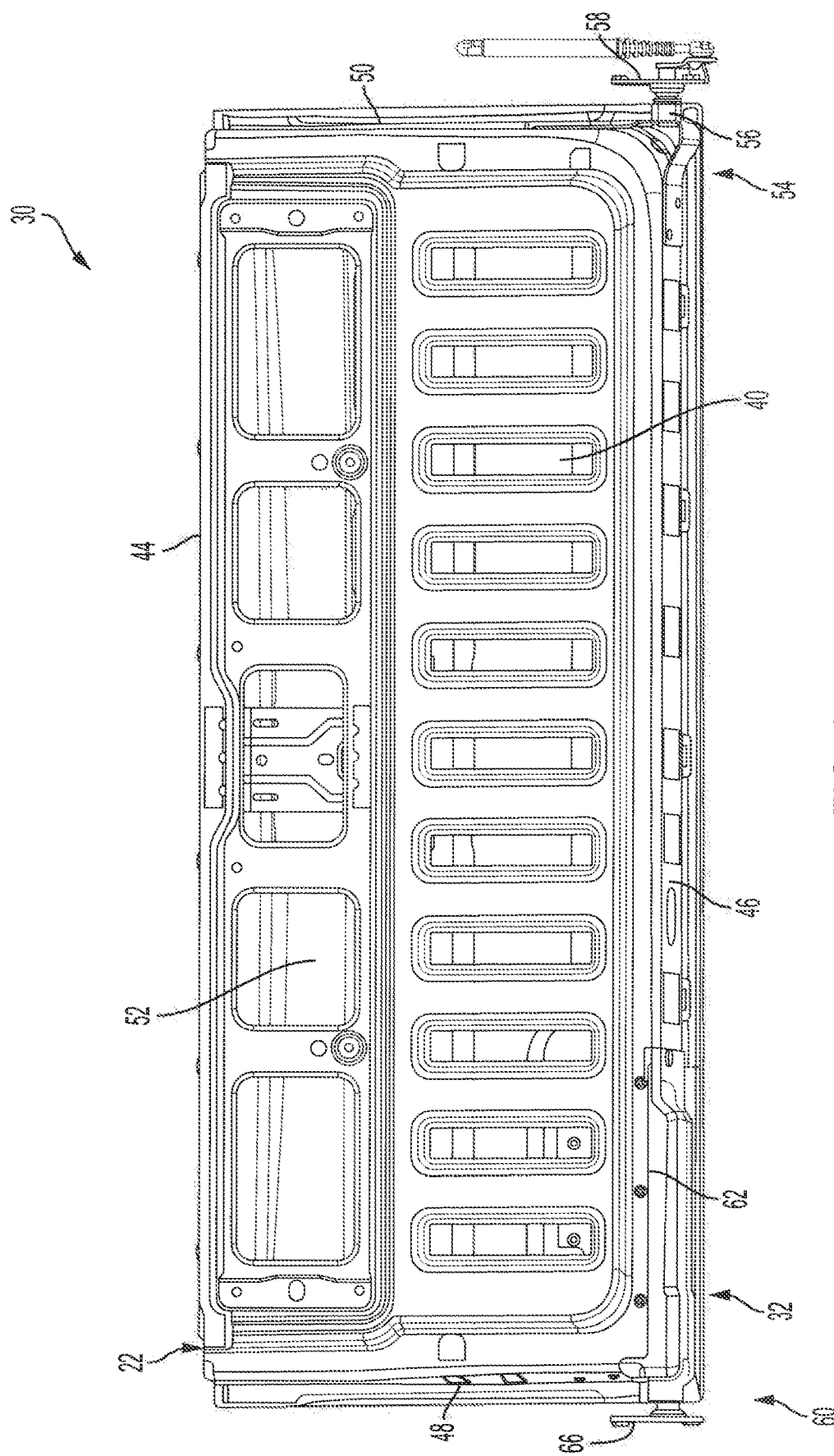
FIG. 3 is a side view of the tailgate and the cartridge assembly of FIG. 2 after assembling, according to the principles of the present disclosure.
Figure 4:
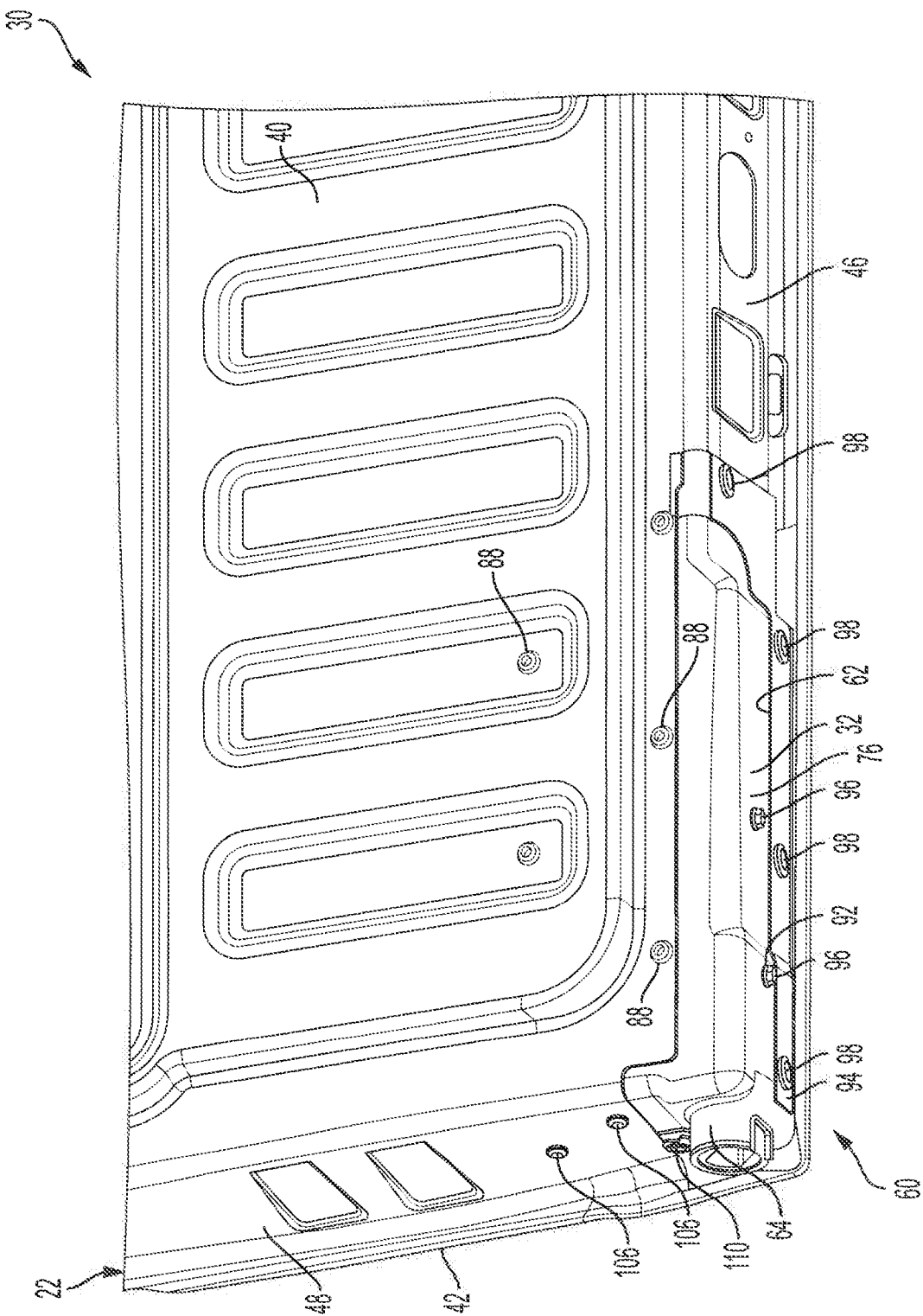
FIG. 4 is an enlarged perspective view of the of the tailgate and cartridge assembly of FIG. 3, according to the principles of the present disclosure.

Referring now to FIGS. 2-4, an example power tailgate assembly 30 for vehicle 10 is illustrated. In the example embodiment, power tailgate assembly 30 generally includes tailgate 22 and a motor mount cartridge assembly 32. As described herein in more detail, the cartridge assembly 32 is configured to be inserted into the tailgate 22 to provide power opening/closing thereof. FIG. 2 illustrates power tailgate assembly 30 before cartridge assembly 32 is mounted to the tailgate 22, and FIGS. 3 and 4 illustrate the power tailgate assembly 30 after cartridge assembly 32 is mounted to the tailgate 22.

With continued reference to FIG. 2, the tailgate 22 generally includes an inner panel 40, an outer panel 42, a top panel 44, a bottom panel 46, and opposed side panels 48, 50. A tailgate inner cavity 52 is generally defined by the panels of the tailgate 22. A first side 54 (e.g., driver side) of the tailgate 22 includes side panel 50, which further includes a pivot cup 56 configured to receive a post 58 coupled to or formed in the vehicle main body (e.g., sidewall 20). The pivot cup 56 and post 58 are operably connected to rotatably couple the tailgate first side 54 to the vehicle 10.

In the example embodiment, a second side 60 of the tailgate 22 includes an opening 62 defined in the bottom panel 46 and the side panel 48. As shown in FIGS. 3 and 4, the cartridge assembly 32 is configured to be inserted into the opening 62 and into the tailgate inner cavity 52 between the inner and outer panels 40, 42 such that the cartridge assembly 32 is substantially concealed within the tailgate 22 and covers opening 62.

As described herein in more detail, the cartridge assembly 32 includes a bottom surface configured to close off the opening when the cartridge assembly 32 is in an installed position, which eliminates the need for a separate close-out panel. As also described herein in more detail, the cartridge assembly 32 defines a pivot cup 64 configured to receive a post 66 coupled to or formed in the vehicle main body (e.g., sidewall 20). The pivot cup 64 and post 66 are operably connected to rotatably couple the tailgate second side 60 to the vehicle 10.

Because cartridge assembly 32 is inserted into the bottom panel 46, a cover is not required on the inner or outer panels 40, 42 to close off the cartridge assembly 32. As such, in the tailgate closed position, cartridge assembly 32 is not visible or is minimally visible. In the tailgate open position, only a small portion of the cartridge assembly 32 is visible through the bottom panel opening 62. As such, an uninterrupted class 'A' surface can be maintained on the inner and outer panels 40, 42.

Figure 6:
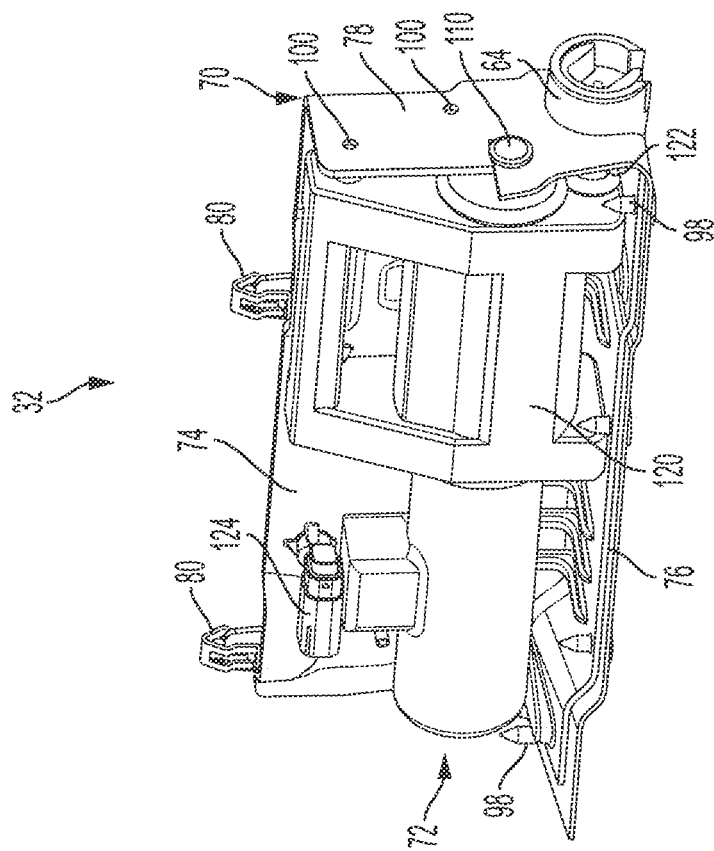
FIG. 6 is a rear perspective view of the cartridge assembly shown in FIG. 5, according to the principles of the present disclosure.
Figure 5:
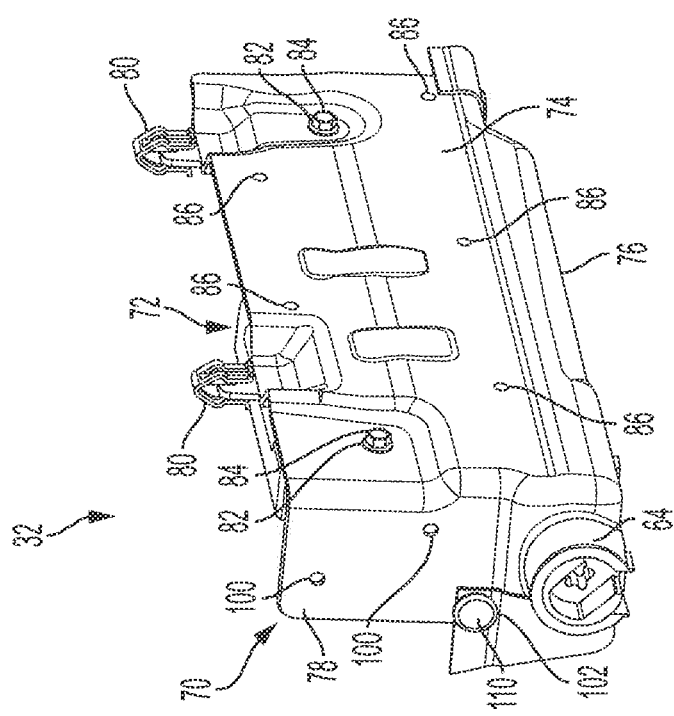
FIG. 5 is a front perspective view of the cartridge assembly of FIG. 2, according to the principles of the present disclosure.

Referring now to FIGS. 5 and 6, the motor mount cartridge assembly 32 will be described in more detail. In the example embodiment, cartridge assembly 32 generally includes a structural cartridge body 70 and a motor assembly 72.

In the example embodiment, the structural cartridge body 70 generally includes a front wall 74, a bottom panel or wall 76, and a side wall 78. The front wall 74 includes a pair of locating and retaining tabs 80 extending upwardly therefrom, and a pair of fastener apertures 82. The locating and retaining tabs 80 are configured to facilitate locating the cartridge assembly 32 within the tailgate inner cavity 52 in a proper/desired orientation when inserted into the bottom panel opening 62. The fastener apertures 82 are configured to receive fasteners 84 (FIG. 5) for coupling the motor assembly 72 to the cartridge body 70. The front wall 74 also includes a plurality of second fastener apertures 86 configured to receive fasteners 88, which are inserted through fastener apertures 90 (FIG. 2) formed in the inner panel 40 (see FIG. 4), to thereby couple the cartridge assembly 32 to the tailgate 22.

In the illustrated example, cartridge body bottom wall 76 includes a first set of fastener apertures 92 and a second set of fastener apertures 94. The first set of fastener apertures 92 are configured to receive fasteners 96 (FIG. 4) for further coupling the motor assembly 72 to the cartridge body 70. The second set of fastener apertures 94 are configured to receive fasteners 98 (FIGS. 4 and 6) for coupling the cartridge body 70 to the tailgate bottom panel 46, as shown in FIG. 4.

In the example embodiment, the cartridge body side wall 78 includes the pivot cup 64, a first set of fastener apertures 100, and a second fastener aperture 102. The pivot cup 64 is integrally formed in the cartridge body 70 so as to protect the motor assembly 72 (e.g., drive unit and shaft coupling) during tailgate installation and removal. In one example, the pivot cup 64 includes an opening 104 configured to enable installation and removal of tailgate 22 at 45° or approximately 45°, and facilitates stabilizing and retaining the tailgate 22 when in the fully open and closed positions. The first set of apertures 100 are configured to receive fasteners 106 (FIG. 4), which are inserted through fastener apertures 108 (FIG. 2) formed in the side panel 48, to thereby further couple the cartridge assembly 32 to the tailgate 22 (see FIG. 4). The second fastener aperture 102 is configured to receive a fastener 110 for coupling the cartridge body 70 to the tailgate side panel 48, as shown in FIG. 4.

As briefly described above, when the cartridge assembly 32 is installed in the inner cavity 52 via opening 62, the bottom wall 76 automatically aligns with and covers the opening 62. In one example implementation, when the cartridge assembly 32 is installed, the bottom wall 76 is disposed flush with or substantially flush with the tailgate bottom panel 46. In one example implementation, when the cartridge assembly 32 is installed, the side wall 78 is disposed flush with or substantially flush with the tailgate side panel 48.

As shown in FIG. 6, in the example embodiment, motor assembly 72 generally includes a motor 120, a driveshaft 122, and an electrical connector 124. The electrical connector 124 is configured to couple to a controller 126 (e.g., ECU) to power and selectively control the motor 120. The controller 126 is configured to communicate with a user activation device (e.g., a key fob) and tailgate latches (not shown) for power opening/closing of the tailgate 22. The motor 120 is configured to rotate the driveshaft 122. In the example embodiment, the distal end of the driveshaft 122 includes a drive coupling 128, which is rotatably disposed within the pivot cup 64. The drive coupling 128 is sized and shaped to receive and operably connect to the post 66. As the motor rotates the driveshaft 122 and the drive coupling 128, the tailgate is rotated opened or closed depending on direction of rotation. In addition, the motor 120 includes electronics for obstruction detection to facilitate protecting the motor.

Described herein are systems and methods for a motor mount cartridge assembly that is quickly and easily installed into a power tailgate and substantially concealed therein. The cartridge assembly can be installed into the tailgate cavity after the paint operation through an opening at a bottom corner of the tailgate between the inner and outer panels. The cartridge assembly is mounted to the tailgate inner panel front face and side face. A motor assembly is pre-assembled onto the cartridge body, which includes an integrally formed pivot cup. Accordingly, the systems provide an aesthetically pleasing appearance of the tailgate inner panel without any added cover to the class 'A' styled reinforcing pattern of the tailgate inner panel. Additionally, the cartridge assembly enables a lower cross-car reinforcement to continue across the tailgate without being truncated.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. A power tailgate assembly for a vehicle, the power tailgate assembly comprising:
a tailgate configured to rotatably couple to the vehicle, the tailgate having an inner panel, an outer panel, a bottom panel, and first and second side panels defining an inner cavity;
an opening defined in at least one of the first side panel and the bottom panel; and
a motor mount cartridge assembly disposed in the inner cavity at least partially within the opening to at least partially conceal the motor mount cartridge assembly within the tailgate, wherein when installed, the motor mount cartridge assembly covers the opening such that the tailgate assembly is free of a discrete cover for covering the opening,
wherein the motor mount cartridge assembly comprises a motor assembly coupled to a cartridge body,
wherein the cartridge body includes a bottom wall, a side wall, and a front wall.

2. The power tailgate assembly of claim 1, wherein the motor assembly is coupled to the front wall and the bottom wall.

3. The power tailgate assembly of claim 1, wherein the cartridge body includes a plurality of locating and retaining tabs extending from the front wall.

4. The power tailgate assembly of claim 1, wherein the cartridge body includes an integrally formed pivot cup configured to receive a post extending from the vehicle to rotatably couple the tailgate to the vehicle.

5. The power tailgate assembly of claim 1, wherein the motor assembly comprises a motor, a driveshaft, and an electrical connector.

6. The power tailgate assembly of claim 1, wherein the motor mount cartridge assembly is installed in the inner cavity between the tailgate inner and outer panels such that an uninterrupted external surface of the inner and outer panels is maintained.

* * * * *